Patented Nov. 21, 1922.

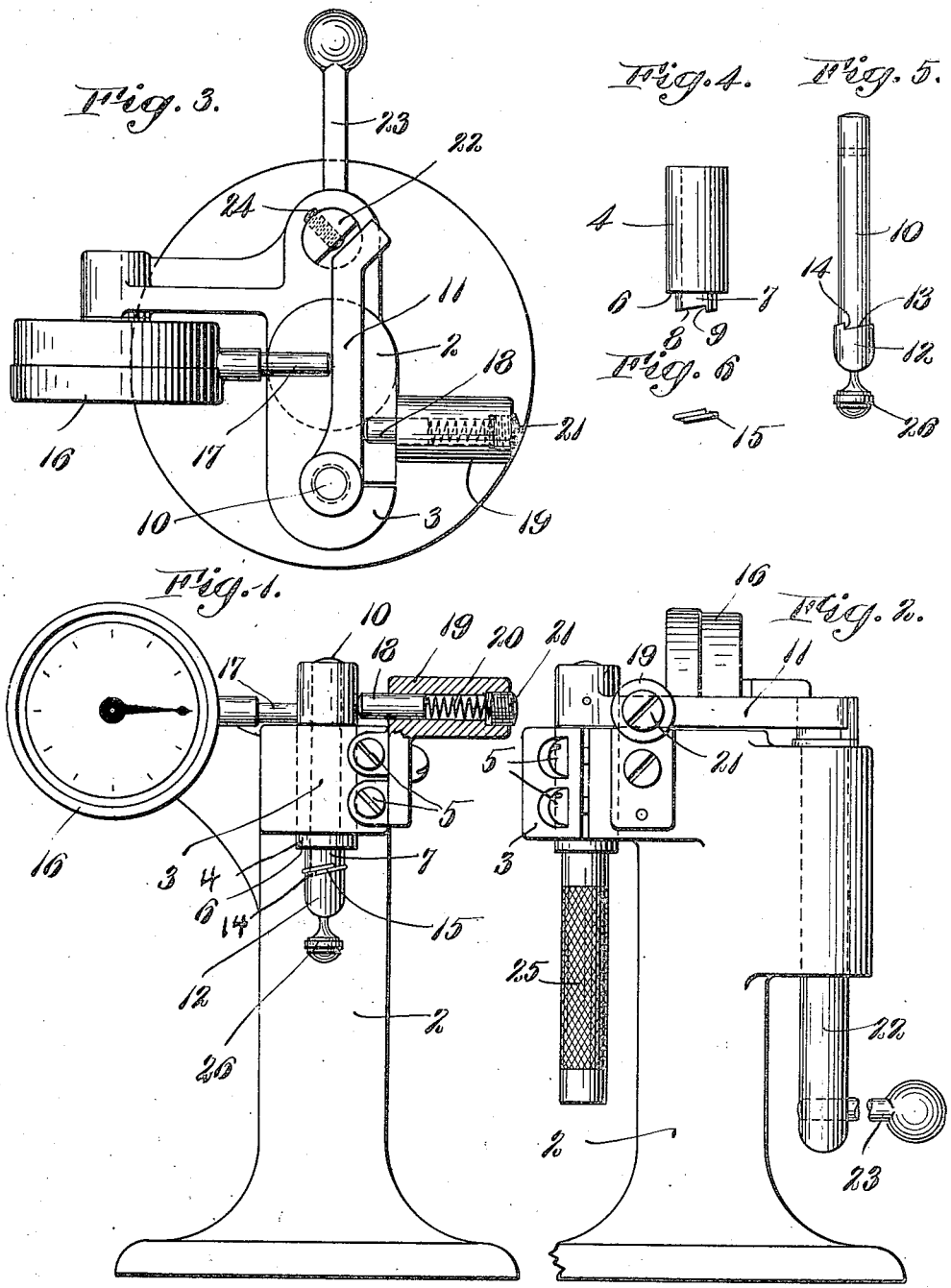

1,436,355

UNITED STATES PATENT OFFICE.

RILEY HERBERT PARKER, OF WINTHROP, MASSACHUSETTS, ASSIGNOR TO GILLETTE SAFETY RAZOR COMPANY, OF BOSTON, MASSACHUSETTS, A CORPORATION OF DELAWARE.

INTERNAL-CIRCUMFERENCE GAUGE.

Application filed November 15, 1918. Serial No. 262,652.

*To all whom it may concern:*

Be it known that I, RILEY HERBERT PARKER, a citizen of the United States, residing at Winthrop, in the county of Suffolk and State of Massachusetts, have invented certain new and useful Improvements in Internal-Circumference Gauges, of which the following is a specification.

My invention relates to devices for measuring circumferences, and is particularly intended to provide a simple and durable gauge by means of which the internal circumference of a tube can be quickly and accurately compared with a predetermined standard. Such gauges are useful for testing drawn tubing with reference to its size, which cannot be accurately determined by measuring its diameter for the reason that the internal contour of such tubing is liable to vary from that of a true cylinder.

The features in which my invention resides are hereinafter described in connection with the accompanying drawing, in which—

Figure 1 is a front elevation of my gauge as preferably constructed, with one of the parts shown in section;

Figure 2 is a side elevation of the gauge as viewed from the right with reference to Figure 1, with a tube in position to be tested;

Figure 3 is a plan view of the gauge, and

Figures 4, 5 and 6 are side elevations showing respectively a sleeve, a stem and a measuring spring employed in the gauge.

In the construction illustrated the moving parts are supported by a standard 2 provided at its upper end with a forwardly-extending split socket 3 which receives a tubular sleeve 4 and in which the sleeve is tightly clamped by means of screws 5. At its lower end the sleeve 4 is provided with a shoulder 6 and below the latter with an extension 7 of smaller diameter, the lower edge of which forms a spiral 8 connected at its ends by a shoulder 9. In the sleeve 4 is mounted a concentric cylindrical stem 10 having a rearwardly-extending arm 11 secured to its upper end, whereby it can be turned in the sleeve, and near its lower end it is provided with an enlarged portion 12 having a diameter equal to that of the extension 7 and forming at its upper edge a spiral 13 of the same pitch as the spiral 8, the ends of the spiral 13 being connected by a shoulder 14. Between the two spirals 8 and 13, which are parallel with each other, is located a spring wire coil 15 surrounding the stem 10 and tending to contract upon the latter by virtue of its spring action, its ends being adapted to abut on the shoulders 9 and 14. Preferably the height of these shoulders is equal to the diameter of the wire from which the coil 15 is made, so that the coil fills the space between the spirals above described, and the end portions of the coil are overlapped somewhat and in contact with each other as shown in Figures 1 and 6. As thus arranged, it will be evident that if the arm 11 is moved to the left, as viewed in Figure 3, the shoulders 9 and 14 will be caused to approach each other and expand the coil 15 by pressing its ends in opposite directions. Changes in the position of the arm 11 are shown by a suitable indicator such as, for example, an ordinary dial gauge 16 carried by the standard 2 and facing forward, with its stem 17 extending laterally and bearing at its free end on the arm 11. The latter is constantly pressed toward the dial gauge by a plunger 18 arranged to slide in a bracket 19 secured to the standard 2 and containing a compression spring 20 located between the plunger and a screw plug 21 constituting an adjustable abutment, the pressure exerted by the spring 20 being sufficient to overcome the tendency of the stem of the dial gauge to move outward.

The arm 11 may be moved in opposition to the spring 20 by hand, if desired, but preferably this is done by means of a vertical rod 22 journalled in the standard 2 and provided with an operating handle 23. At its upper end, which projects above the standard 2, the rod 22 is cut away on one side to provide a space which receives the end portion of the arm 11 when the parts are in the position illustrated, but when the rod is turned from this position in either direction it engages the arm 11 and acts as a cam to move its free end to the right, as viewed in Figure 3, thereby forcing the plunger 18 inward and permitting the stem 17 to move outward. The upper end of the rod 22 also acts as a stop to limit the movement of the arm 11 in the direction which increases the diameter of the coil 15, thereby rendering it impossible to expand said coil to such an extent as to break or permanently deform it. Such expansion may be still further limited, if desired, by mounting in the upper end of the rod 22 an adjustable stop screw 24 in position to be engaged by the arm 11. The purpose of the angular formation of said arm is to promote symmetry by enabling the rod 22 to be located directly behind the sleeve 4 and stem 10, and is not otherwise important.

The parts 7 and 12 are made of such size that they and the coil 15 when contracted can enter freely into the part to be tested, which is shown in Figure 2 as a knurled tube 25, and in using the device the handle 23 is first moved in either direction until the arm 11 is swung away from the dial gauge 16 to a sufficient extent to permit the coil 15 to contract upon the stem 10, whereupon the tube 25 is slipped upward over the contracted coil until its upper end abuts against the shoulder 6. The handle 23 is then moved into the position shown in Figure 3 and is followed by the arm 11 under the influence of the spring 20, which movement results in increasing the size of the coil 15 and continues until the expansion of the latter is arrested by the tube 25, the stop screw 24 being suitably adjusted to secure this result. The coil 15, being flexible, adapts itself to the contour of the tube and thus affords a measure of the internal circumference of the latter, the measurement being indicated by the reading on the dial gauge, and preferably the latter is so adjusted that its reading will be zero when the internal circumference of the tube is exactly equal to that of the standard adopted. Any departure from this standard will then be indicated by a plus or minus reading on the dial gauge. After the internal circumference of the tube has thus been measured the handle 23 is again operated sufficiently to permit the coil 15 to contract, thereby leaving the tube free to be withdrawn.

26 indicates a disc of felt or equivalent material carried by the stem 10 at its lower end and serving as a swab to remove any accumulation of dirt from the interior of the tube 25 which might otherwise affect its measurement.

It will be evident that the details of the construction above described may be modified in various ways, particularly as regards the means employed for operating the coil and for indicating its size when its expansion is arrested, my invention being characterized primarily by the employment of a flexible coil in connection with means for expanding it until it fills the bore to be tested and for indicating its size when so expanded. The flexible coil need not necessarily be made of spring wire, although it is preferable to do so for the reason that it avoids the necessity of positively connecting the ends of the coil to the adjacent parts. It is also preferable, though not essential, to expand the coil by means of a spring, as in the device illustrated, since in such case the force exerted on the coil when its expansion is arrested is constant and therefore the readings obtained are not subject to the inaccuracies which might exist if the coil were expanded by force applied by the operator. The device can be readily adapted for testing tubes of various sizes by removing the sleeve 4 with the parts attached to it and replacing the same by equivalent parts having dimensions suitable for the particular tube to be tested.

I claim:

1. An internal-circumference gauge comprising a spring wire coil normally tending to contract and adapted to enter the part to be measured, means for expanding the coil comprising an arm located outside of said part and a spring acting thereon in opposition to the spring action of the coil with a force normally sufficient to overcome said spring action, and means for indicating the size of the coil.

2. An internal-circumference gauge comprising a stem and a sleeve surrounding the same, both the sleeve and the stem being adapted to enter the part to be measured, a flexible coil also surrounding the stem, means on the sleeve and stem for engaging the ends of the coil, means for producing a relative rotation of the sleeve and stem to expand the coil, and means for indicating the size of the coil.

3. An internal-circumference gauge comprising a stem adapted to enter the part to be measured, a sleeve surrounding the stem, a spring wire coil also surrounding the stem adjacent to the sleeve and normally tending to contract, said sleeve and stem being provided with oppositely-facing shoulders for engaging the ends of the coil, means for producing a relative rotation of the sleeve and stem to expand the coil, and means for indicating the size of the latter.

4. An internal-circumference gauge comprising two members arranged end to end, the opposed ends of said members being formed on spirals terminating in oppositely-facing shoulders, a spring wire coil normally tending to contract and located between said spirals with its ends in position to abut against the respective shoulders, means for producing a relative rotation of said members to expand the coil, and means for indicating the size of the latter.

5. An internal-circumference gauge comprising a stem and a sleeve surrounding the same, both the sleeve and the stem being adapted to enter the part to be measured, a flexible coil also surrounding that part of the stem which enters the part to be measured, means on the sleeve and stem for engaging the ends of the coil, means for producing a relative rotation of the sleeve and stem including an arm secured to one of said parts and located on the exterior of the part to be measured, and a dial gauge arranged to be operated by said arm.

6. An internal-circumference gauge comprising a stem adapted to enter the part to be measured, a sleeve surrounding the stem, a flexible coil also surrounding the stem adjacent to the sleeve, means on the sleeve and stem for engaging the ends of the coil, means for producing a relative rotation of the sleeve and stem including an arm secured to one of said parts, a dial gauge arranged to be operated by said arm, and spring-actuated means for moving the arm in such direction as to expand the coil.

7. An internal-circumference gauge comprising a standard, a sleeve detachably secured thereto, a stem concentric with the sleeve and arranged to turn therein, both the sleeve and the stem being adapted to enter the part to be measured, a flexible coil surrounding that part of the stem which enters the part to be measured, means on the sleeve and stem for engaging the ends of the coil, means located outside of the part to be measured for rotating the stem to expand the coil, and means for indicating the size of the coil.

8. An internal-circumference gauge comprising a standard, a sleeve secured thereto and provided with a cylindrical extension of reduced diameter and with a shoulder at the base of the extension, a stem adapted to rotate in the sleeve and provided with an enlarged portion adapted to enter the part to be measured and having the same diameter as the reduced extension of the sleeve, a spring wire coil surrounding the stem between the enlarged portion of the latter and the extension of the sleeve, said extension and stem being provided with means for engaging the ends of the coil, means for rotating the stem to expand the coil, and means for indicating the size of the latter.

9. An internal-circumference gauge comprising a stem adapted to enter the part to be measured and provided at its entering end with a cleaning device, a sleeve surrounding the stem, a flexible coil surrounding the stem adjacent to the sleeve, means on the sleeve and stem for engaging the ends of the coil, means for producing a relative rotation of the sleeve and stem, and means for indicating the size of the coil.

10. An internal-circumference gauge comprising a stem adapted to enter the part to be measured, a sleeve surrounding the stem, a flexible coil also surrounding the stem adjacent to the sleeve, means on the sleeve and stem for engaging the ends of the coil, means for producing a relative rotation of the sleeve and stem including an arm secured to one of said parts, a dial gauge arranged to be operated by said arm, spring-actuated means for moving the arm in such direction as to expand the coil, and an adjustable stop for limiting said movement.

11. An internal-circumference gauge comprising a stem adapted to enter the part to be measured, a sleeve surrounding the stem, a flexible coil also surrounding the stem adjacent to the sleeve, means on the sleeve and stem for engaging the ends of the coil, means for producing a relative rotation of the sleeve and stem including an arm secured to one of said parts, a dial gauge arranged to be operated by said arm, spring-actuated means for moving the arm in such direction as to expand the coil, and manually-operated means arranged to move said arm in the opposite direction and provided with an adjustable stop for limiting the movement of the arm under the influence of said spring-actuated means.

Signed at Boston, Mass., this ninth day of November, 1918.

RILEY HERBERT PARKER.